N. P. PEARSE.
ROLL FOR COTTON GINS AND THE LIKE.
APPLICATION FILED MAY 20, 1910.
1,043,248.
Patented Nov. 5, 1912.
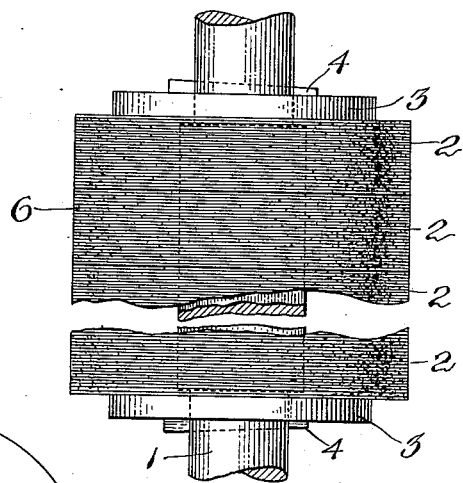
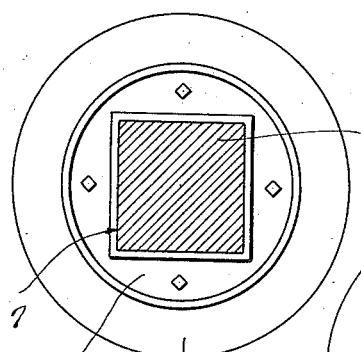
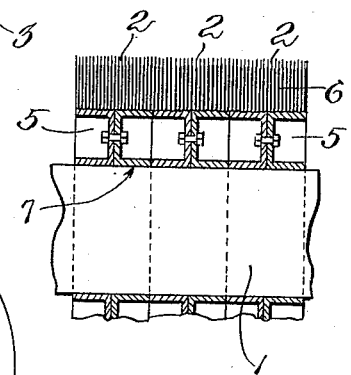
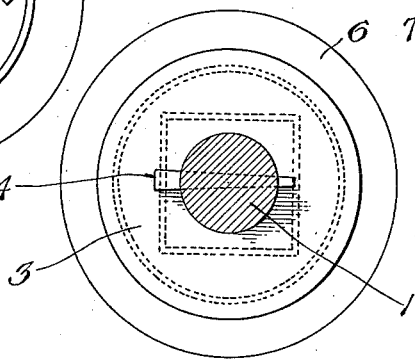
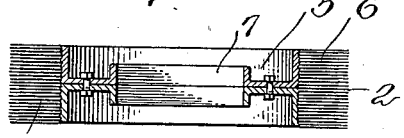
Witnesses:
Edward Maxwell
Wm. J. Pike
Inventor:
Norman Pain Pearse
by Geo. W. Maxwell,
Attorney.

UNITED STATES PATENT OFFICE.

NORMAN PAIN PEARSE, OF LONDON, ENGLAND.

ROLL FOR COTTON-GINS AND THE LIKE.

1,043,248.  Specification of Letters Patent.  Patented Nov. 5, 1912.

Application filed May 20, 1910. Serial No. 562,417.

*To all whom it may concern:*

Be it known that I, NORMAN PAIN PEARSE, a subject of Great Britain, and resident of London, in the county of Middlesex, England, have invented an Improvement in Rolls for Cotton-Gins and the Like, of which the following description, in connection with the accompanying drawings, is a specification, like letters on the drawings representing like parts.

The object of my present invention is to produce a roll having a durable and long-wearing ginning surface, uniform in density and structure at all points, and made so as not to require roughening in order to keep a proper surface.

A further feature resides in constructing the roll in sections so that any part may be readily removed with inappreciable expense and without substantial loss of time. To this end, the covering is made in parts or sections, vulcanized on holder rings or sectional supports independently movable on a shaft, and then all clamped firmly together by end plates, thus making a practically unitary roll of the desired length with a regular and even surface that can be turned to a desired size. The sections or parts are preferably made so as to lock into one another or with relation to the shaft so that they are kept rigid and immovable. The material used for the ginning surface preferably consists of layers of haircloth combined with layers of woven fabric, cotton, or flax, molded together, the hairs of the haircloth or equivalent stiff fibers being placed so as to point outward from the center, the different layers being held together by rubber solution, oxidized oils, or other vulcanizable material, the whole being molded to proper shape and then vulcanized together. Thereafter the surface is specially shaped by being turned in usual manner. By providing the separate sections as described, I am enabled to get better results in molding and shaping the layers of the covering material than when the roll is all made as one piece.

In the drawings, Figure 1 is a plan view, partly broken away, of a complete roll; Fig. 2 shows one of the sections in end elevation in position on its shaft; Fig. 3 is a fragmentary view in longitudinal section; Fig. 4 is a cross sectional view showing the roll proper in end elevation; and Fig. 5 is a horizontal sectional detail of one of the sections.

On a suitable shaft 1, herein shown as having its roll length made rectangular in cross section, I mount a series of sections 2 side by side, which are then clamped together by end plates 3 secured by any suitable means, as for instance by taper pins 4. Each section consists of a central supporting member or core part 5 covered with a surface material 6. The core part has a central hole 7 which fits the rectangular portion of the shaft 1. The core parts 5 are herein shown as metal stampings, which, although individually somewhat frail, mutually support each other when clamped together as an entire roll, with a resulting strength and firmness which, combined with the obvious lightness and simplicity, produce a superior roll. The ginning surface has already been described, and is preferably vulcanized directly upon the stamped core parts 5. Instead of the woven layers mentioned, other fibrous material such as paper or paper pulp may be used. It will also be understood that the core parts may be made of castings or other suitable material capable of being brought to the required shape for the purpose described. I prefer to make the core parts in the form of rings as shown, having square holes at the center whereby they interlock with the shaft to the best advantage.

Having described my invention, what I claim as new and desire to secure by Letters Patent is:

1. A ginning roll comprising a plurality of separate core parts each consisting of an inner angular horizontally extending removable portion to removably receive a shaft, an outer cylindrical portion to constitute with other similar parts, a continuous multi-part cylindrical surface of uniform diameter at all points, and an intermediate integral radial web, means for securing said webs together to hold all of said core parts rigidly assembled, and an annular section of ginning material secured to each section of said cylindrical surface to form a continuous roll.

2. A ginning roll, comprising a supporting shaft, a plurality of separate core parts secured side by side on the shaft, each of said core parts consisting of a pair of U-shaped members secured back to back, said core parts forming a substantially continuous cylindrical surface, and an annular section of cotton ginning material secured to each section of said cylindrical surface to form a continuous roll.

3. A ginning roll, comprising an angular supporting shaft, a plurality of separate core parts arranged side by side on the shaft, each of said core parts comprising a pair of members having inner and outer parallel flanges and an intermediate web, said webs being secured together and said outer flanges forming a cylindrical surface, and ginning material vulcanized to each of the cylindrical surface sections.

4. A ginning roll, comprising a supporting shaft non-circular in cross section, a plurality of separate core-parts removably assembled side by side on said shaft, each of said core-parts consisting of a pair of members with radial webs fastened together and inner and outer parallel flanges extending therefrom, said inner flanges being formed to fit said shaft, and said outer flanges forming with the adjacent core-parts a continuous cylindrical surface, and ginning material vulcanized to each of the cylindrical surface sections.

In testimony whereof, I have signed my name to this specification, in the presence of two subscribing witnesses.

NORMAN PAIN PEARSE.

Witnesses:
RIPLEY WILSON,
H. D. JAMESON.

Copies of this patent may be obtained for five cents each, by addressing the "Commissioner of Patents, Washington, D. C."